6027X
J. Willard,
Brick Machine,
Patented June 10, 1830.
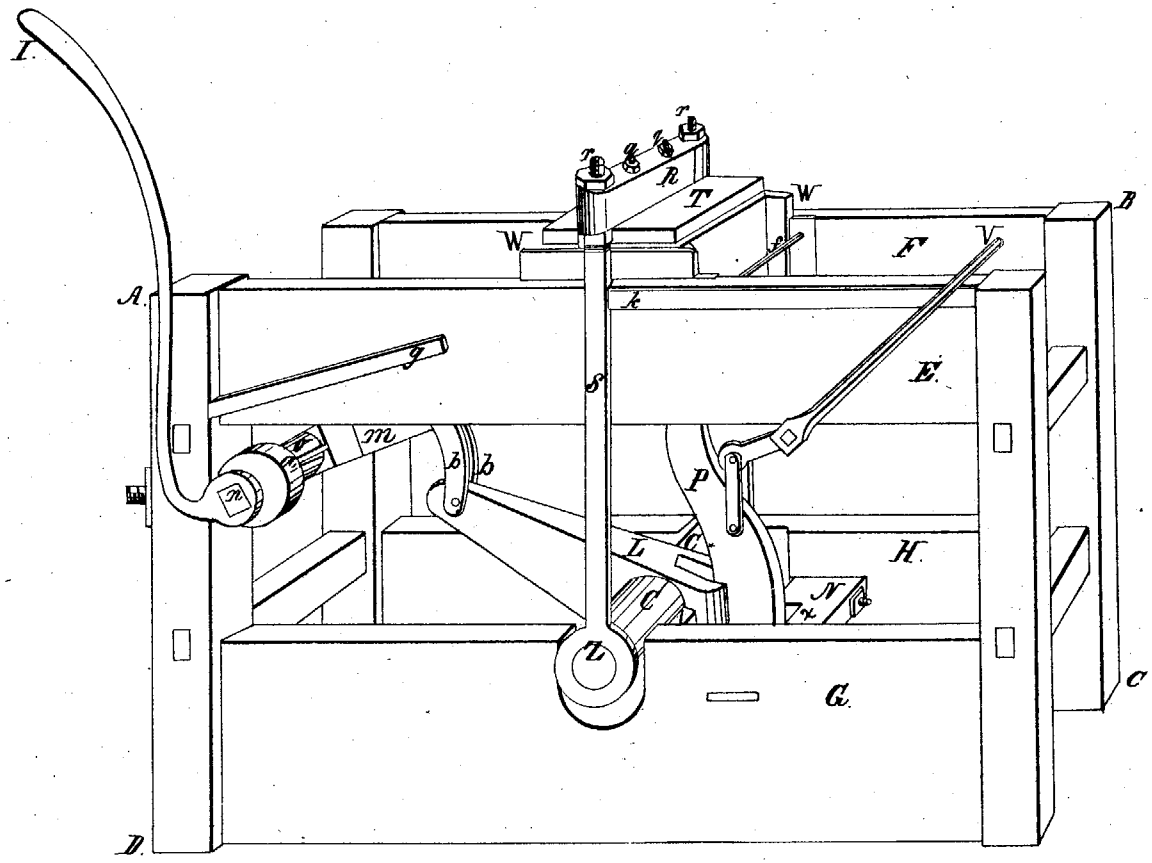
AM. PHOTO-LITHO. CO. N.Y. (OSBORNE'S PROCESS)

Julius Willard, of Baltimore, State of Maryland.

Letters Patent.

The schedule referred to in these Letters Patent and making part of the same containing a description in the words of the said Julius Willard, himself of his Improvement in the Brick Press called the "Bridle Brick Press".

To all to whom these presents shall come,

Be it known that I Julius Willard of the City of Baltimore, Baltimore County and State of Maryland, have invented a new and useful improvement in the Brick press called "Willard's Bridle Brick Press," and that the following is a full and exact description of the construction and operation of the said Machine as invented by me, — to wit. In the annexed drawing A,B,C,D, is a substantial wooden frame about 4 feet long, 2 ft 6 inches high, and from one foot to one foot six inches wide, the corner posts may be six inches square and the rails E.F.G,H, about three inches thick, by twelve inches deep, the whole being mortised and strongly pinned together and connected by crosspieces. Two semicircles are notched out in the upper edges of the rails G,H, to receive and permit to move freely without touching the cylindrical transverse arms, (C,C,) of the main lever (L. which together with the lever are of iron, and cast solid; the arms C,C, projecting over the rails and have square shoulders with two round pinions Z; also along their sides towards the short arm of the lever (L) is cast a square tongue (t) (scarcely perceptible in the drawing) the outer ends rest in the bottom of the grooves faced with iron on the inner surfaces of the rails G.H, (not seen in the drawing) and serve at one part of the operation as a fulcrum or resting point to the lever (L) which will be explained hereafter. (I.) is the piston stand which is also of cast iron having near its lower end a square shoulder, in which the extremity of the short arm of the lever L has hold on it; its foot descends through a large square mortise (x.) in a wooden cross piece (N) framed into the rails G,H, and is acted on by five governing screws, in the cross piece N, only one of which is seen in the drawing, for the purpose of levelling the piston or moveable bottom plate of the mould, which is

[illegible]

firmly attached by nuts and screws on its upper ends, (S) is one side or strap of the
wrought iron bridle (the other not being seen in this view of the machine) both of
which attach by means of circular eyes in their lower ends to the round pinions (Z)
of the arms (c, c,) of the main lever (L) and have their upper ends made fast
to the bridle head R by two screw nuts, (r. r.) above and below R in such a man-
-ner that by moving the nuts (r. r.) the top plate T of the mould fastened to
the bridle head R by the screws and nuts q, q, may be adjusted so as to face
level on the upper edge of the mould W.W. which is a common brick mould
of wrought iron filled and firmly fastened by screws or otherwise between
the upper rails F. F. - and to make it still more permanent, bracing rods (f) are
made to connect the opposite ends of the mould. (I.) is the wrought iron pressing
lever, bent in the manner shown in the drawing, and having a square eye, by
which it attaches to the square pinion (n) of the cast iron axis (O) which has its
bearing in iron eyes, (d) attached to the post A and is cast solid with an arm
(m) the end of which is connected by pins and the bridle or wrought iron strap
(b, b) to the extremity of the long arm, of the main lever (L) forming a parallel
joint - the piston stand (P) is also operated on by a similar attachment and
the small wrought iron hand lever (V) which may be called the discharging
lever. Now when the pressing lever I. is thrown back, in the position shown in the
drawing its weight falling on one side of its attachment (n) by reason of its bent
form causes the long arm of the main lever L to rise and the bearing or fulcrum
being on the tongue t in the bottom of the grooves above mentioned; a correspondent
rise takes place in the cylindrical arms c, c, and also in the bridle head R and its
attached top plate T; the bridle being thus relieved, whilst the main lever con-
tinues to rest on the tongue t is thrown back till its straps S are checked by the
ends of the small wooden springs g fastened on the outside of the rails B.F.
for that purpose. The clay (tempered in the usual way) is then introduced into
the mould W.W. after which the bridle is replaced by moving it in a contrary di-
rection till the straps strike the ends of the wooden strips or checks K; (adjusted
so as to stop the plate T. precisely over the mould) the pressing lever I is then brought
down so as to press the long arm of the main lever L. the first part of the motion
serves to close the top plate T on the upper edges of the mould W.W. and
the moment this takes place, the axles c c. cease to ascend, the bearing on the

6027X tongue t, is released and the whole strap falls upon the circular eyes Z. of the
strap S of the bridle, and whilst it serves as a new fulcrum for the lever Io, by the
[illegible] arm of which the piston stand P is forced up and compresses the brick, also
serves to press down the top plate T under the bridle head R. After the pressure is
finished, the lever I, is thrown back, the bridle head is taken off as before and on
bearing down the lever V. the piston stand P is forced up and the brick dislodg
-ed from the mould. Now what I claim as new and as my own
invention, is the application of the bridle S.R.S. and the peculiar form and appli
-cation of the main lever (Io) and its connexion with the bridle S.R.S by which
the upward and downward pressures i,e, the downward pressure on the fulcrum
Z or the top plate T, and the upward pressure on the piston stand P or its plate,
are made to react on each other, also the application and arrangement of the
parallel joint, other levers and governing screws to and for this special pur
-pose. Given under my hand this 27th day of April 1830.

Witnesses
W. S. Elliot
R. H. Fenwick

Julius Willard.

1175 [illegible]

E. L.
ChfW.